(12) United States Patent
Wein et al.

(10) Patent No.: US 7,106,443 B2
(45) Date of Patent: Sep. 12, 2006

(54) OPTICAL SIGNAL-TO-NOISE MONITOR HAVING INCREASED COHERENCE

(75) Inventors: Steven J. Wein, Sudbury, MA (US); James D. Targove, Sudbury, MA (US)

(73) Assignee: Lighthouse Capital Partners, Inc., Greenbrae, CA (US)

( * ) Notice: Subject to any disclaimer, the term of this patent is extended or adjusted under 35 U.S.C. 154(b) by 157 days.

(21) Appl. No.: 10/411,871

(22) Filed: Apr. 10, 2003

(65) Prior Publication Data

US 2003/0219250 A1 Nov. 27, 2003

Related U.S. Application Data

(60) Provisional application No. 60/371,534, filed on Apr. 10, 2002.

(51) Int. Cl.
*G01J 4/00* (2006.01)

(52) U.S. Cl. ....................................... 356/364

(58) Field of Classification Search ............. 356/73.1, 356/365, 364; 398/26, 65, 152
See application file for complete search history.

(56) References Cited

U.S. PATENT DOCUMENTS

| | | | |
|---|---|---|---|
| 3,636,359 A | 1/1972 | Hooper | 250/217 |
| 3,700,334 A | 10/1972 | Low et al. | 356/106 |
| 3,881,823 A | 5/1975 | De Lang et al. | 356/106 |
| 4,802,765 A | 2/1989 | Young et al. | 356/487 |
| 4,849,762 A | 7/1989 | Barnes | 342/188 |
| 4,859,066 A | 8/1989 | Sommargren | 356/487 |
| 5,081,348 A * | 1/1992 | Siddiqui | 356/367 |
| 5,227,623 A | 7/1993 | Heffner | |
| 5,444,532 A | 8/1995 | Sueyoshi | 356/349 |
| 5,528,369 A | 6/1996 | Starkey | 356/351 |
| 5,654,793 A | 8/1997 | Barlow et al. | |
| 5,712,704 A | 1/1998 | Martin et al. | |
| 5,734,473 A | 3/1998 | Gerhart et al. | 356/364 |
| 5,808,795 A | 9/1998 | Shimomura et al. | 359/488 |
| 5,850,492 A | 12/1998 | Morasca et al. | |
| 5,852,496 A | 12/1998 | Gisin et al. | |
| 5,859,939 A | 1/1999 | Fee et al. | |
| 5,872,540 A * | 2/1999 | Casabona et al. | 342/362 |
| 5,930,414 A | 7/1999 | Fishman et al. | |
| 5,949,560 A | 9/1999 | Roberts et al. | |
| 5,965,874 A | 10/1999 | Aso et al. | |
| 6,011,253 A | 1/2000 | Hakki | |
| 6,104,492 A * | 8/2000 | Giles et al. | 356/454 |
| 6,104,515 A | 8/2000 | Cao | |
| 6,130,766 A | 10/2000 | Cao | |
| 6,134,034 A | 10/2000 | Terahara | 359/124 |
| 6,144,450 A | 11/2000 | Jopson et al. | |

(Continued)

FOREIGN PATENT DOCUMENTS

EP        0 909 045 A2     4/1999

(Continued)

OTHER PUBLICATIONS

U.S. Appl. No. 10/101,427, filed Mar. 19, 2002, Wein et al.

(Continued)

*Primary Examiner*—Layla G. Lauchman
*Assistant Examiner*—Juan D. Valentin, II
(74) *Attorney, Agent, or Firm*—Goodwin Procter LLP (57) ABSTRACT

Methods and apparatus for rapid, accurate OSNR measurements by directly measuring the spectrally-resolved State of Polarization (SOP) variation across each DWDM channel and using a polarization controller to deterministically extinguish the signal across narrow frequency subbands within each DWDM channel. In-band ASE noise is subsequently measured as a function of frequency across the channel bandwidth.

9 Claims, 11 Drawing Sheets

U.S. PATENT DOCUMENTS

| | | | | |
|---|---|---|---|---|
| 6,147,802 | A | 11/2000 | Itoh et al. | 359/500 |
| 6,188,477 | B1 | 2/2001 | Pu et al. | 356/351 |
| 6,204,924 | B1 | 3/2001 | Cyr | |
| 6,211,957 | B1 | 4/2001 | Erdogan et al. | |
| 6,229,599 | B1 | 5/2001 | Galtarossa | |
| 6,229,606 | B1 | 5/2001 | Way et al. | |
| 6,327,039 | B1 | 12/2001 | De Groot et al. | 356/517 |
| 6,373,604 | B1 | 4/2002 | Xie | 398/79 |
| 6,400,479 | B1 | 6/2002 | Zhou et al. | 359/134 |
| 6,421,131 | B1 | 7/2002 | Miller | 356/453 |
| 6,459,487 | B1 | 10/2002 | Chen et al. | 356/491 |
| 6,504,642 | B1 | 1/2003 | Albert et al. | 359/256 |
| 6,519,027 | B1 * | 2/2003 | Gordon et al. | 356/73.1 |
| 6,563,641 | B1 | 5/2003 | Zhao | 359/495 |
| 6,567,167 | B1 | 5/2003 | Chou et al. | 356/367 |
| 6,570,711 | B1 | 5/2003 | Duceillier | 359/629 |
| 6,603,890 | B1 | 8/2003 | Khosravani et al. | 385/11 |
| 6,710,904 | B1 | 3/2004 | Penninckx et al. | 398/111 |
| 6,750,956 | B1 * | 6/2004 | Moeller | 356/73.1 |
| 6,757,066 | B1 | 6/2004 | Hill | 356/493 |
| 6,765,670 | B1 * | 7/2004 | Olsson et al. | 356/73.1 |
| 6,816,261 | B1 * | 11/2004 | Patel et al. | 356/365 |
| 6,836,327 | B1 * | 12/2004 | Yao | 356/367 |
| 6,847,484 | B1 * | 1/2005 | Damask et al. | 398/152 |
| 6,856,386 | B1 * | 2/2005 | Anderson et al. | 356/73.1 |
| 6,867,918 | B1 * | 3/2005 | Damask | 398/152 |
| 2002/0024704 | A1 * | 2/2002 | Erdogan et al. | 359/156 |
| 2002/0044282 | A1 * | 4/2002 | Moeller et al. | 356/369 |
| 2004/0114923 | A1 * | 6/2004 | Chung et al. | 398/26 |

FOREIGN PATENT DOCUMENTS

| | | |
|---|---|---|
| WO | 01/42749 A1 | 6/2001 |
| WO | 01/61385 A2 | 8/2001 |
| WO | 01/67644 A1 | 9/2001 |

OTHER PUBLICATIONS

U.S. Appl. No. 10/218,681, filed Aug. 14, 2002, Wein et al.
U.S. Appl. No. 09/767,919, filed Dec. 20, 2001, Chung et al.
U.S. Appl. No. 10/389,706, filed Mar. 14, 2003, Wein et al.
U.S. Appl. No. 10/259,171, filed Sep. 27, 2002, Menikoff et al.
U.S. Appl. No. 10/207,357, filed Jan. 30, 2002, Ito et al.
Bock et al., "Characterization of Highly Birefringent Optical Fibers Using Interferometric Techniques," IEEE Instrumentation and Measurement Technology Conference, Brussells, Belgium (Jun. 4-6, 1996), pp. 927-932.
Bülow., "PMD Mitigation Techniques and Their Effectiveness in Installed Fiber" OFC Conference Proceedings, pp. THH101-THH103, Baltimore Maryland, Mar. 7-10, 2000.
Francia et al., "Simple Dynamic Polarisation Mode Dispersion Compensator," Eletronics Letters, vol. 35, No. 5 (Mar. 4, 1999), pp. 414-415.
Gordon et al., "PMD Fundamentals: Polarization Mode Dispersion in Optical Fibers," PNAS, vol. 97, No. 9 ( Apr. 25, 2000) pp. 4541-4550.
Heisman, "Polarization Mode Dispersion: Fundamentals and Impact on Optical Communication Systems," Tutorial part of the ECOC Conference in Madrid Spain (Sep. 20-24, 1998), pp. 51-79.
Oberson et al., "Interferometric Polarization Mode Dispersion Measurements with Femtosecond Sensitivity," Wave Technology, vol. 15, No. 10 (Oct. 1997), pp. 1852-1857.
Poole et al., "Chapter 6: Polarization Effects in Lightwave Systems," *Optical Fiber Telecommunications IIIA*, editors Kaminow and Koch, Morgan Kaufmman Publishers, 1997, pp. 114-161.
Pua et al., "An Adaptive First-Order Polarization-Mode Dispersion Compensation System Aided by Polarization Scrambling: Theory and Demonstration," Journal of Lighwave Technology, vol. 18, No. 6 (Jun. 2000), pp. 832-841.
Keller, C.U. "Zurich Imaging Stokes Polarimeters I and II", Jul. 25, 1994, p. 222-230, Proceedings of the SPIE, SPIE, Bellingham, VA, US.
International Search Authority, "International Search Report", PCT Application No. PCT/US 02/25918, mailed on Dec. 17, 2002, pp. 1-4.
International Search Authority, "International Search Report," PCT Application No. PCT/US/02/08399, mailed on Jul. 30, 2002, pp. 1-5.
International Search Authority, "International Search Report," PCT Application No. PCT/US02/30711, mailed on May 8, 2003, pp. 1-3.
Mader, W., "Management of Optical Networks, Final Report," pp. 1-49, Feb. 26, 1999.
Agrawal, G.P., "Fiber-Optic Communication Systems," 2nd Ed., pp. 365-366, Aug. 1997.
Lee et al., "OSNR monitoring technique using polarization-nulling method" in IEEE Photonics Technology Letters, vol. 13, No. 1, pp. 88-90, Jan. 2001.
"First Office Action," U.S. Appl. No. 10/101,427, mailed on Feb. 24, 2003, pp. 1-12.
International Search Authority, "International Search Report," PCT Application No. PCT/US03/07703, mailed on Sep. 24, 2003, 4 pgs.
International Search Authority, "International Search Report," PCT Application No. PCT/US03/11133, mailed on Sep. 26, 2003, 3 pgs.
Valentin, Juan D. Office Action for U.S. Appl. No. 10/218,681, mailed Jan. 22, 2004, pp. 1-16.
Lee, David J. Office Action for U.S. Appl. No. 10/259,171, mailed on Mar. 25, 2005, pp. 1-18.
Shafer, Ricky D. Office Action for U.S. Appl. No. 10/389,706, mailed on Mar. 26, 2005, pp. 1-11.

* cited by examiner

_OPTICAL SIGNAL-TO-NOISE MONITOR HAVING INCREASED COHERENCE_

CROSS-REFERENCE TO RELATED APPLICATIONS

The present application claims the benefit of co-pending United States provisional application No. 60/371,534, filed on Apr. 10, 2002, and assigned to Terapulse, Inc., the entire disclosure of which is incorporated by reference as if set forth in its entirety herein.

FIELD OF THE INVENTION

The present invention relates to optical measurements, and, in particular, to methods and apparatus for optical signal-to-noise measurements.

BACKGROUND OF THE INVENTION

The optical signal-to-noise ratio (OSNR) is a direct measure of the quality of signal carried by an optical telecommunications link. The OSNR is the ratio of the power of the signal in the channel to the power of the noise in the channel:

$$OSNR = \frac{P_{signal}}{P_{noise}} \quad \text{(Eq. 1)}$$

The OSNR may provide a very good estimate of the bit-error rate (BER) of the optical link and, as such, a measurement of the OSNR is often important for real-time optical network management at the physical layer.

The OSNR of an optical communications link is typically high, often in excess of 15 dB, 20 dB, or greater, under normal and proper operating conditions. The dominant component of the noise in the link is typically the result of a background effect known as amplified spontaneous emission (ASE). ASE is a broadband noise source contributed by the optical amplifiers in the link.

The limiting noise source in most long-haul optical networks is the signal-ASE beat noise, in which the signal and the ASE coherently mix. In typical optical communications systems using optical amplifiers, signal-ASE beat noise is the limiting noise term for optical performance. Thus, direct measurements of the ASE level and the signal level provide an indicative measure of the OSNR of the system and Eq. 1 becomes:

$$OSNR = \frac{P_{signal}}{P_{ASE}} \quad \text{(Eq. 2)}$$

The noise power in this calculation is typically normalized to represent the power in a Reference Bandwidth (RBW), typically 0.1 nm. Since the OSNR approximates the BER of the channel, direct measurements of the ASE level and the signal level may ultimately provide the BER of the channel. A methodology that provides a direct and accurate measurement of the ASE level is therefore useful for high speed optical network monitoring.

Figure 1:
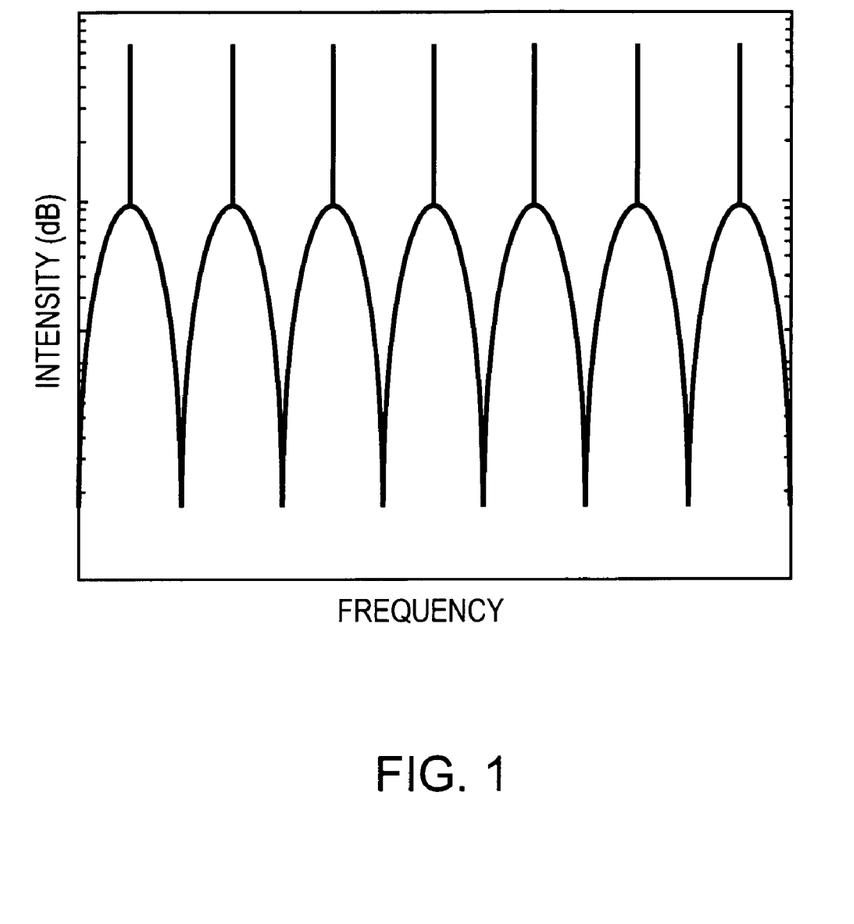
FIG. 1 illustrates the frequency spectra of adjacent optical channels in a DWDM optical system.

Referring to FIG. 1, a dense wavelength division multiplexing (DWDM) optical system carries a number of distinct optical channels utilizing different optical frequencies. The available optical channels in the system are typically evenly spaced in frequency on the so-called ITU (International Telecommunications Union) grid. Two adjacent utilized channels therefore have closely-spaced frequency spectra, as shown in FIG. 1.

One method for measuring the level of the ASE noise in an optical link is to make a power measurement at a frequency between two adjacent DWDM channels (i.e., an out-of-band measurement) and to assume that whatever power is measured at this frequency is due solely to ASE effects. This assumes that the "signal" midway between the center frequencies of two adjacent DWDM channels is primarily due to ASE noise.

This assumption is valid to the extent that the ASE has a "white" optical spectrum, thereby being substantially uniform across various wavelengths (or frequencies). However, the optical components in a DWDM system, e.g., optical bandpass filters and other component filter functions, typically spectrally shape the ASE spectrum so that it varies among particular measurement frequencies.

Moreover, the signal spectrum of the channel has a spectral shape that is itself influenced by the modulation format of the data carried by the channel, and is similarly altered by the filter functions of the aforementioned elements of the system. For example, RZ data modulation formats (or many of the variations thereof) have wide modulation bandwidths. The data formats have power levels at the frequencies midway between adjacent ITU center channel frequencies that are sufficient to distort attempted measurements of ASE noise at those out-of-band frequencies. That is, with such wide modulation bandwidths, the signal spectra from adjacent DWDM channels may overlap or cross at the midpoint between adjacent channels with power levels comparable to or in excess of the power level of the ASE noise.

The result is that the signal spectra masks the underlying ASE noise level even when the ASE measurement is performed reasonably far away from the center of a given DWDM channel, thereby decreasing the available dynamic range or sensitivity of the OSNR measurement. The net result is that out-of-band noise measurements—made at the mid-point between adjacent DWDM channels—are typically not sufficiently indicative of the in-band noise levels which actually impact system performance.

A second problem with this methodology is that adjacent DWDM channels may originate at different locations and thereby accumulate different amounts of ASE noise en route to the location of an optical monitor. A measurement at or near the mid-point frequency between adjacent channels (as described above) may then measure a combination of the ASE noise levels associated with the two adjacent DWDM channels. Therefore, it would be advantageous to be capable of performing in-band ASE measurements at wavelengths not restricted to the band including the mid-point frequency between adjacent DWM channels.

SUMMARY OF THE INVENTION

The present invention relates to methods and apparatus for performing OSNR measurements utilizing, in part, direct ASE noise measurements. In summary, an optical channel is divided into frequency bands. The signal component in a band is extinguished and the remnant power in the band is measured. The controller extinguishing the signal is reset and the maximum power in the band is measured. From these measurements, the signal power and the noise power are used to determined the OSNR in the band and, subsequently, in the channel.

In one aspect, the present invention provides a method for performing optical measurements within an optical channel. The polarization state of a signal is measured over a frequency subband in the channel. The signal in the frequency subband is extinguished using the measured polarization state and the power of a noise component in the frequency subband is determined. Additionally, the combined power of the signal and the noise component in the frequency subband is determined.

In one embodiment, the measurement of polarization state, signal extinction, and the measurement of noise power is iterated over multiple frequency subbands in the optical channel. This iteration is performed in parallel or seriatim. In another embodiment, extinguishing the signal includes transforming the polarization state of the signal to a polarization state that is nominally orthogonal to the polarization state of the transmission axis of an optical polarizer. In a further embodiment, determining the noise power includes measuring the power of the noise component after the transformation of the signal to the first polarization state, transforming the polarization state of the signal to a second polarization state that is nominally different from the first polarization state, determining the power of the noise component after the transformation to the second polarization state, and retaining the lower of the two noise power measurements. The difference between the first polarization state and the second polarization state is predetermined or, alternately, determined in real time.

In another embodiment, determining the combined power of the signal and noise components includes transforming the polarization state of the signal to a polarization state that is nominally aligned with the polarization state of the transmission axis of an optical polarizer.

In another aspect, the present invention provides an apparatus for determining the optical signal-to-noise ratio in an optical channel including a polarimeter, a signal extinguisher in optical communication with the polarimeter, and a detection instrument in optical communication with the signal extinguisher. The apparatus optionally includes an optical tap in optical communication with the polarimeter. In one embodiment, the signal extinguisher includes a polarization controller in optical communication with the polarimeter and a polarizer in optical communication with the polarization controller.

In one embodiment, the polarization controller includes fixed-orientation waveplates with variable retardance. In another embodiment, the polarization controller includes rotating-orientation waveplates with fixed retardance. In various embodiments, the waveplates of the polarization controller are fiber squeezers, lithium niobate waveguides, electro-optic crystals, rotating crystalline waveplates, fiber loop rotating waveplates, nematic liquid crystals, ferroelectric liquid crystals, or electroclinic liquid crystals.

In one embodiment, the polarizer is a linear polarizer. In another embodiment, the polarizer transmits any fixed polarization state with an acceptably large extinction ratio. In still another embodiment, the polarizer is an organic polarizer. In various embodiments, the organic polarizer includes a wire grid lithographic polarizer or a subwavelength lithographic polarizer.

In another embodiment, the polarizer is a prism-based polarizer. In various embodiments, the prism-based polarizer includes a Glen-Thompson beam displacing prism, a yttrium vanadate beam displacing prism, or a calcite beam displacing prism. In one embodiment, the prism-based polarizer additionally includes collimating optics.

In still another embodiment, the signal extinguisher includes a multichannel polarization controller. In another embodiment, the detection instrument includes a tunable filter in optical communication with the signal extinguisher, and a detector in optical communication with the tunable filter. The detection instrument may optionally include optics in optical communication with the detector.

In yet another embodiment, the detection instrument includes an array of detectors. In various embodiments, the array of detectors may include a charge-coupled device (CCD) array, an integrated photodiode array, an array of discrete detectors, or an array of photodiodes. In another embodiment, the detection instrument includes a narrowband optical filter, such as a Fabry-Perot interference filter with a varying center wavelength caused by a spatial variation in the spacer optical thickness. In still another embodiment, the detection instrument includes a spectral disperser, such as an array wave grating, a volume phase grating spectrometer, a reflective grating spectrometer, or an echelle spectrometer.

In another aspect, the present invention provides an apparatus for determining the optical signal-to-noise ratio in an optical channel. The apparatus includes a tunable filter, a polarization controller, and a polarimeter in optical communication with the polarization controller, the polarimeter including a polarizer. In one embodiment, the polarimeter is a Stokes polarimeter.

In various embodiments, the polarization controller includes fiber squeezers, lithium niobate waveguides, electro-optic crystals, rotating crystalline waveplates, fiber loop rotating waveplates, nematic liquid crystals, ferroelectric liquid crystals, or electroclinic liquid crystals.

In one embodiment, the polarizer is a linear polarizer. In another embodiment, the polarizer transmits any fixed polarization state with an acceptably large extinction ratio. In a further embodiment, the polarizer is an organic polarizer. Various embodiments of the polarizer include a wire grid lithographic polarizer or a subwavelength lithographic polarizer. In still another embodiment, the polarizer is a prism-based polarizer. Suitable embodiments of the prism-based polarizer include a Glan-Thompson beam displacing prism, a yttrium vanadate beam displacing prism, or a calcite beam displacing prism. In a further embodiment, the prism-based polarizer includes collimating optics.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

In brief overview, the current invention provides methods and apparatus that allow for rapid, accurate OSNR measurements by directly measuring the spectrally-resolved State of Polarization (SOP) variation across each DWDM channel and using a polarization controller to deterministically extinguish the signal in narrow frequency subbands within each DWDM channel. In-band ASE noise is then accurately measured as a function of frequency across the channel bandwidth.

The signal at a laser transmitter is very highly polarized, typically in a linear orientation. In contrast, the signal at an optical monitor is somewhat depolarized due to component and fiber effects, particularly polarization mode dispersion (PMD). Furthermore, the ASE noise component in an optical channel is substantially unpolarized. These differences in polarization state may be exploited to measure the ASE noise in a signal channel.

For example, two waveplates placed in front of a linear polarizer and a photodetector may be used to measure the ASE noise in a signal channel. Rotating the waveplates in front of the polarizer and photodetector periodically varies the polarization state of a tapped signal. The minimum value of photocurrent over a 2.5 second data series is then assumed to be a measurement of the ASE power. At this minimum photocurrent, the transformed polarization state of the signal is assumed to be close to linear polarization, with a major axis approximately perpendicular to transmission axis of the polarizer.

However, this method suffers from several disadvantages. First, polarization scanning using the rotation of waveplates results in a slow temporal measurement of OSNR. Second, the integrated measurement of an entire DWDM channel makes the measurement extremely sensitive to depolarization effects across the modulation bandwidth of the channel, limiting its ability to create adequate source extinction in many cases of interest.

Polarization mode dispersion (PMD), for example, typically produces a spread in polarization states within and across the spectral bandwidth of a single DWDM channel. Attempting to convert the polarization state of a signal of interest to a particular state (linear polarization, for example) by passing the signal through a polarization controller will typically result in a spread or blur in the resulting polarization states about the nominally linearly polarized output state because of PMD effects. The result is sub-optimal extinction, since a portion of the signal is not linearly polarized.

Thus, PMD limits the accuracy of OSNR measurements made using this method, as the variation in polarization state across a DWDM channel makes it impractical to simultaneously extinguish the signal component across the entire channel. The power in the unextinguished signal component adds to the power of the ASE noise in the photocurrent measurements, reducing the OSNR measurement accuracy.

Reducing the spectral bandwidth of the signal increases both the degree of polarization (DOP) and the coherence of the signal. At the theoretical limit of infinitely narrow spectral bandwidth, the DOP and signal coherence both go to unity. That is, at the limit of infinitely narrow spectral bandwidth, a signal is composed of perfectly polarized sinusoidal waves at each of its component frequencies; the same is true of the ASE noise.

Providing any physically-realizable spectral bandwidth brings the ASE back to an incoherent, unpolarized state. The temporal fluctuations in the polarization state have a frequency comparable to the spectral bandwidth. For example, if the spectral bandwidth of a detector is set at 8 GHz, the fluctuations in polarization state will be on the time scale of ⅛ GHz, i.e., 0.125 nsec, and averaging the signal for a period much longer than that, e.g., ten to one hundred times longer, will make the ASE noise appear unpolarized and incoherent.

From a practical perspective, the ASE appears as an unpolarized DC source. Reducing the spectral bandwidth increases the DOP of the signal and reduces the spread in the polarization state of the signal due to PMD, allowing for improved signal extinction. So, for practical purposes, the narrower the spectral bandwidth the better, until in the extreme case the ASE effects mentioned above become significant.

POLARIZATION DESCRIPTION OF THE INVENTION

The operation of the present invention is now illustrated utilizing a Poincaré sphere representation of the incident light signal and the optical transmission system. In overview, the electric field vector E of a light signal, such as the signal carried by an optical fiber, is expressed generally as a sum of x and y vector components, $E_x$ and $E_y$, having a constant phase offset $\epsilon$:

$$E = \begin{bmatrix} E_x \\ E_y e^{i\epsilon} \end{bmatrix}. \quad \text{(Eq. 3)}$$

Generally, the electric field vector E is elliptically polarized, i.e., $E_x$ and $E_y$ are both non-zero, following an elliptical path in $E_x$ and $E_y$ with time. Linear and circular polarizations are degenerate cases of elliptical polarization, with the electric field vector describing a line or circle with time, respectively, rather than an ellipse.

Figure 2:
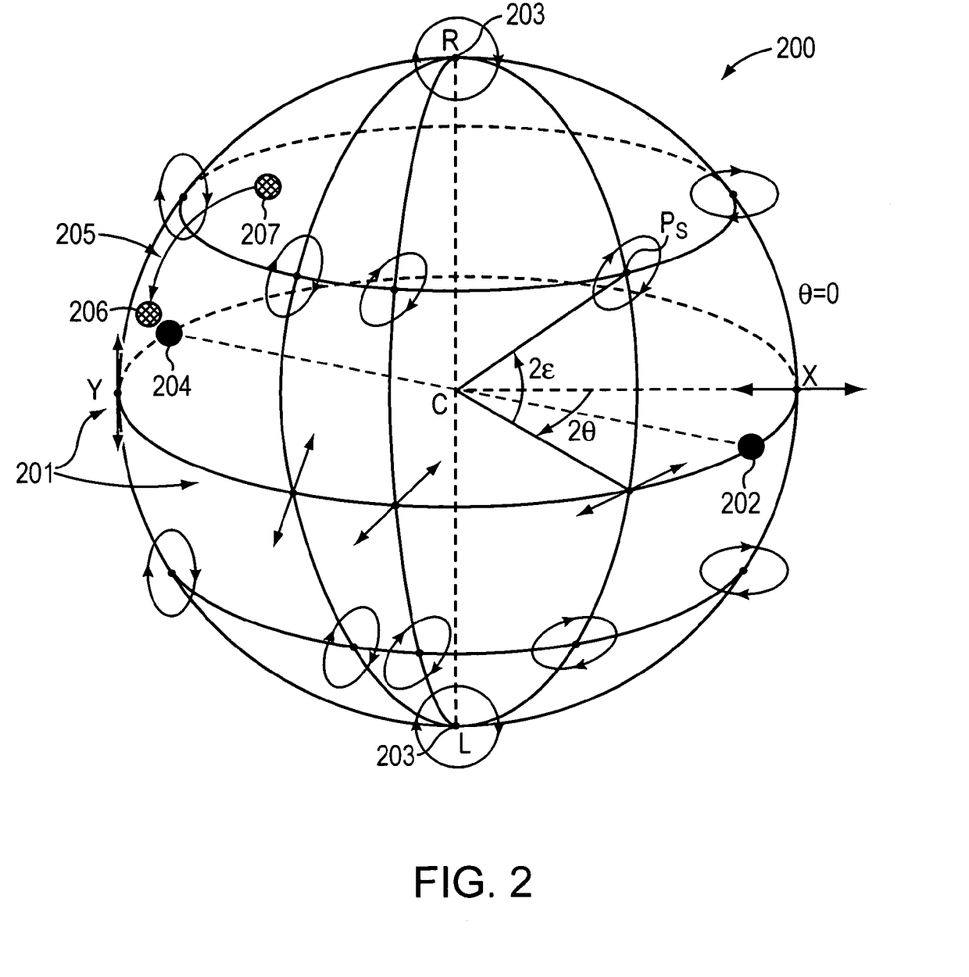
FIG. 2 presents the Poincaré sphere representation of polarization state.

One convenient way to represent the set of all possible polarization states is a Poincaré sphere, shown in FIG. 2. Each line of latitude on the sphere represents an ellipticity value, with linear polarization at the equator 201 and circular polarization at the poles 203. Each line of longitude represents a fixed azimuth for the semi-major axis of the polarization ellipse. One degree of longitude on the sphere represents 0.5 degrees of physical rotation of a polarization axis. The handedness of the polarization state changes between the two hemispheres, with right-handed polarization occurring in the upper hemisphere and left-handed polarization occurring in the lower hemisphere.

On the Poincaré sphere, the transmission axis of an optical polarizer is represented by a polarizer polarization state 202. For a linear polarizer, the polarizer polarization state 202 lies on the equator of the Poincaré sphere, but this is not required for the operation of the invention. An optical signal having orthogonal polarization 204 incident on a polarizer having polarizer polarization state 200 will experience maximum extinction at the polarizer.

In brief overview, referring to the Poincaré sphere of FIG. 2, the methods and apparatus of the present invention maximally extinguish the signal component of the channel by transforming the input polarization state 207 of the signal component to a polarization state 206 through a polarization transformation 205 using a polarization controller. The resulting transformed polarization state 206 at the polarizer is nominally aligned with the polarization state 204 that is orthogonal to the polarizer.

If the input polarization state 207 is spread by depolarization, then the transformed polarization state 206 is also spread by depolarization, limiting the range of frequencies over which the signal is capable of simultaneous extinction. The methods and apparatus of the present invention reduce the effect of depolarization by performing measurements over narrow instantaneous frequency ranges, therefore having significantly reduced depolarization.

ILLUSTRATIVE EMBODIMENTS OF THE INVENTION

Figure 3:
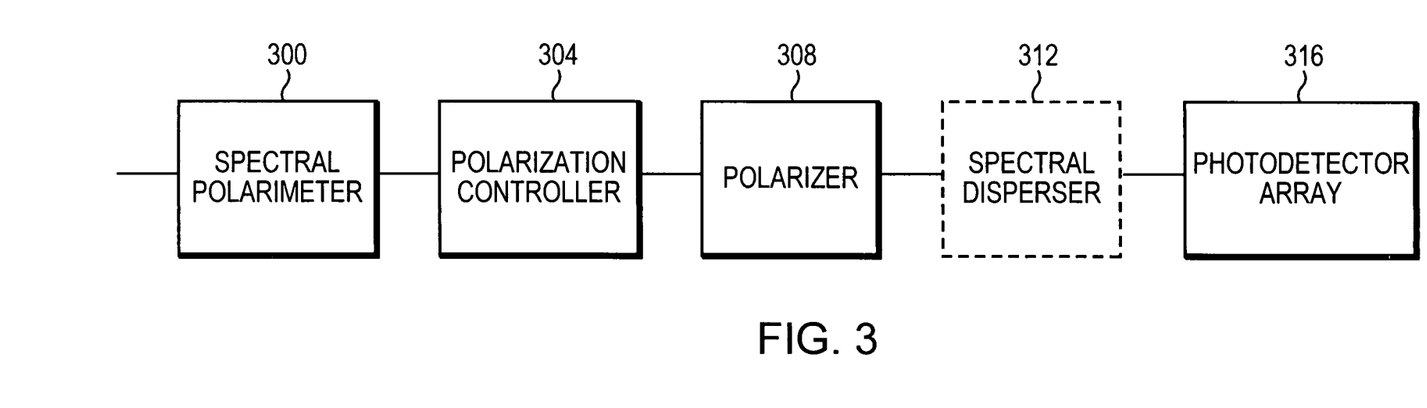
FIG. 3 illustrates an embodiment of an OSNR monitor in accord with the present invention.

One embodiment of the OSNR monitor of the current invention—shown in FIG. 3—uses a spectral polarimeter 300, a polarization controller 304, a polarizer 308, a spectral disperser 312, and a detector array 316, arranged in a serial configuration, with each component in optical communication with its neighboring components.

In operation, the spectral polarimeter 300 measures the polarization state of incident light across a wide spectral band with a spectral resolution narrower than the bandwidth of a single optical channel. After the measurement by the polarimeter 300, the combination of the polarization controller 304 and the polarizer 308 is used to extinguish the signal power component. The polarization controller 304 converts the incident polarization state 207 of each spectral bin measured by the spectral polarimeter 300 to a transformed polarization state 206 nominally orthogonal to the transmission axis of the polarizer 308. The polarizer 308 extinguishes the transformed signal, resulting in nominally one-half of the ASE power being transmitted through the polarizer 308 and optional spectral disperser 312 to the photodetector 316. The result is an accurate measurement of the ASE noise within the measurement bandwidth.

When the Degree of Polarization for a single DWDM channel is sufficiently high, a single polarization controller setting is used to extinguish the signal for an entire DWDM channel. In the more general case, having signal depolarization across the channel bandwidth, multiple, distinct polarization controller settings are typically used to extinguish the signal component in each polarimeter spectral bin or narrow frequency subband.

When multiple controller settings are used, the polarization controller 304 extinguishes signals in multiple bins either sequentially or substantially in parallel. In the parallel approach, the signal is dispersed across a multichannel polarization controller 304' that independently transforms the State of Polarization of each frequency subband. In the sequential approach, the signal is extinguished for each channel in turn and the ASE noise power measured. A tunable filter and a single detector measures one frequency bin at a time or, as illustrated in FIG. 3, a spectral disperser 312 disperses the signal spectrum across an array of detectors 316, with the optical dispersion and finite detector size resulting in narrow-band filtering of the measurements.

There are several ways to provide a sample of the signal of interest to the OSNR monitor. In a fiber optics communications channel, a small fraction of the signal power (typically <1%) may be tapped off for the monitor with a fiber splitter. In other embodiments, a free space optical tap is used or, alternately, the optical monitor directly monitors the optical fiber.

Typical polarimeters 300 include, for example, an in-line fiber polarimeter or a free-space polarimeter. The measurement resolution of the polarimeter 300 is selected to be narrow enough that the State of Polarization of the incident signal is substantially constant across each resolution element. For fiber optic communications, spectral bands of interest include the C band (approximately 1530–1560 nm) and L band (approximately 1565–1610 nm). Suitable spectral polarimeters 300 for use with the present invention are described in pending U.S. patent applications Ser. Nos. 10/101,427 and 10/218,681, assigned to Terapulse, Inc., the entire contents of which are incorporated herein by reference.

Several polarization controllers 304 are suitable for use with the present invention, including fixed-orientation waveplates with variable retardance and rotating-orientation waveplates with fixed retardance. In those embodiments where the polarization controller 304 is located after an optical tap, the polarization controller 304 need not operate in a reset-free mode. When a linear polarizer 308 is used, the polarization controller 304 may have two or more waveplates, depending upon the implementation. Possible embodiments for the polarization controller waveplates include, but are not limited to, fiber squeezers, lithium niobate waveguides, electro-optic crystals, liquid crystals (including nematic, ferroelectric, and electroclinic varieties), rotating crystalline waveplates, and fiber loop rotating waveplates.

Similarly, any polarizer 308 that transmits any fixed polarization state with an acceptably large extinction ratio is suitable for use with the present invention. One particular polarizer 308 suited for use with the present invention is a linear polarizer. Possible polarizers 308 include, but are not limited to, organic polarizers such as POLAROID or 3M sheet, POLARCOR polarizing glass marketed by Corning, and wire grid and subwavelength lithographic polarizers. Prism-based polarizers, such as Glan-Thompson or yttrium vanadate or calcite beam displacing prisms, are also suitable when used with nominally collimating optics.

Examples of suitable wavelength demultiplexers 312 for spectral dispersion include, but are not limited to, array waveguide gratings (AWG), volume phase grating spectrometers, reflective grating spectrometers, and echelle spectrometers, in both free-space and planar implementations.

Suitable detector 316 configurations include, for example, an array of detectors, two or more physically separate detectors, or an integrated detector array. Exemplary detector elements are: charge-coupled device ("CCD") arrays, integrated photodiode arrays, and arrays of discrete detectors. In telecommunications applications, InGaAs photodiodes are suited to both array and discrete detector applications. It is to be understood that the terms "array of detectors" and "detector array" are interchangeably used herein and in the claims. Optional auxiliary optics may be used to image the spectrum onto the photodetector 316 to facilitate the measurement of the residual ASE signals.

Figure 4:
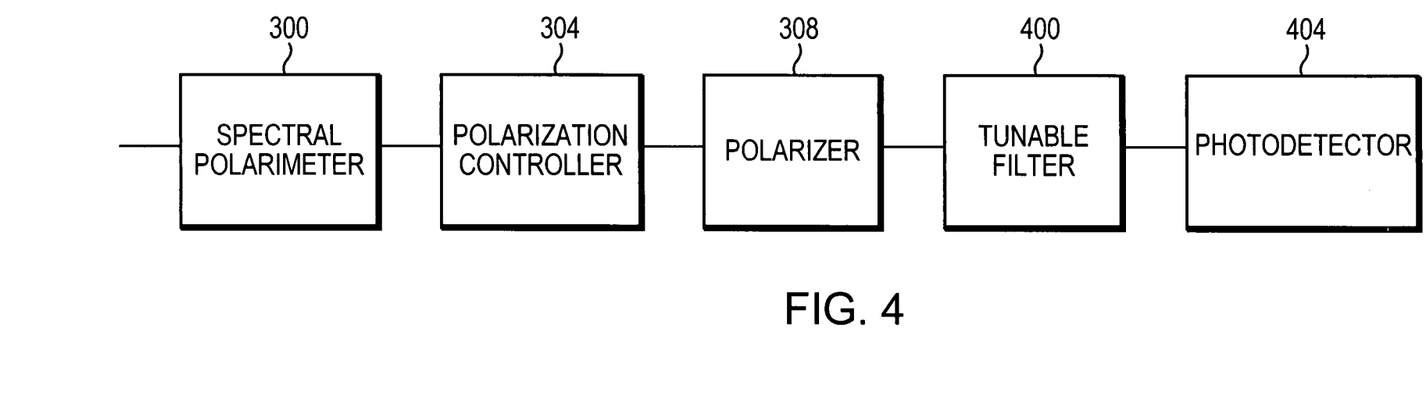
FIG. 4 presents another embodiment of an OSNR monitor in accord with the present invention.

In another embodiment, the spectral disperser 312 and detector array 316 used in the parallel algorithm are replaced with a tunable filter 400 and a single pixel detector 404 used in a sequential algorithm, as shown in FIG. 4. The spectral dispersion is generated by temporal scanning of the filter 400, in contrast to the spatial dispersion in the previous embodiment. A single photodetector element 404 sequentially collects frequency subband measurements as the filter 400 is scanned.

Figure 5:
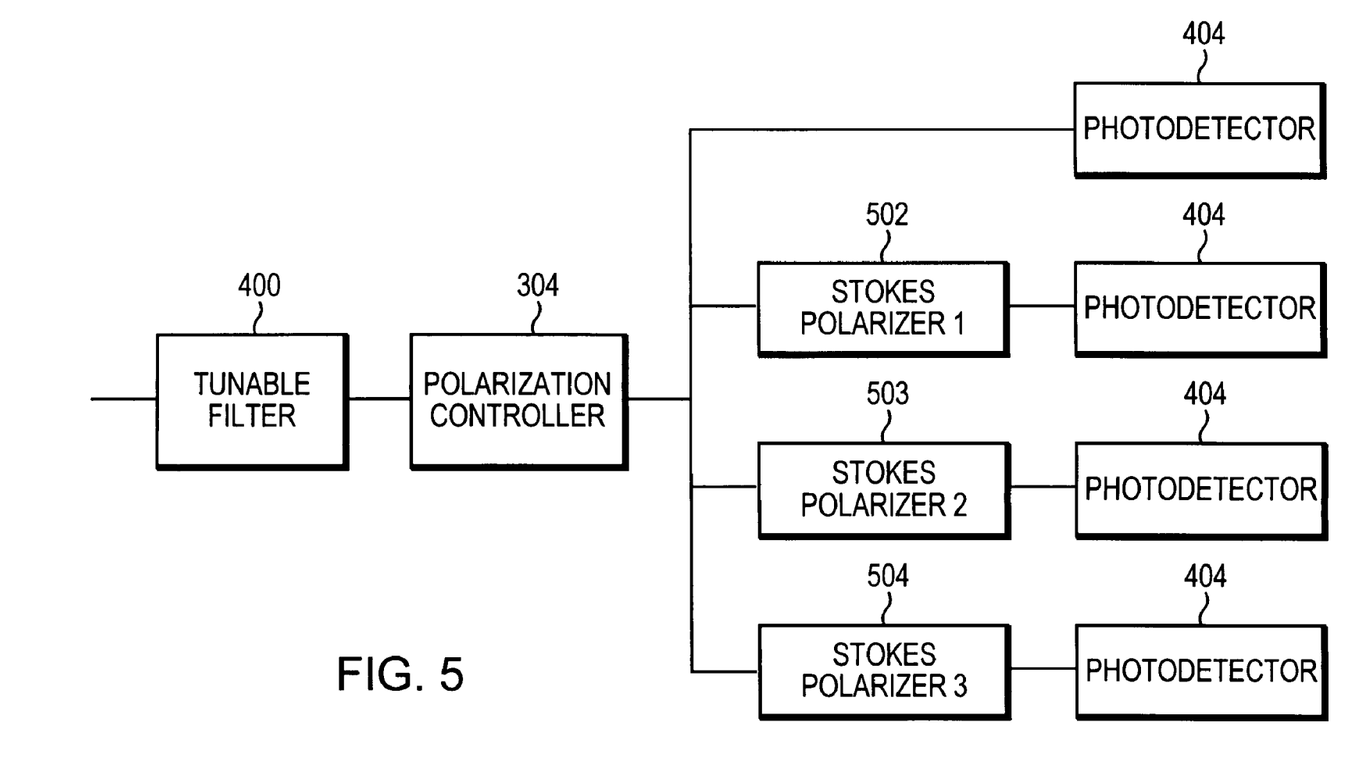
FIG. 5 illustrates still another embodiment of an OSNR monitor using a tunable filter and a Stokes polarimeter in accord with the present invention.

A related embodiment replaces the spectral polarimeter with a tunable filter 500 and a Stokes polarimeter 501, as shown in FIG. 5. The tunable filter 500 spectrally samples the input light, and the Stokes polarimeter 501 simultaneously detects the individual Stokes parameters of the incident light, using the traditional Stokes analyzers 502-04 placed in front of 4 individual photodetectors. Any of the Stokes analyzers 502-04 may also provide the functionality of the polarizer 308 for the signal nulling operation, and the output of the Stokes polarimeter 501 is used to determine the setting of the polarization controller 304 which will null the signal for any of the three polarimeter channels. A similar embodiment replaces the Stokes analyzers 502-04 with 3 blazed fiber Bragg gratings, which perform the same polarization function and direct the Stokes components to the photodetectors 404.

Figure 6:
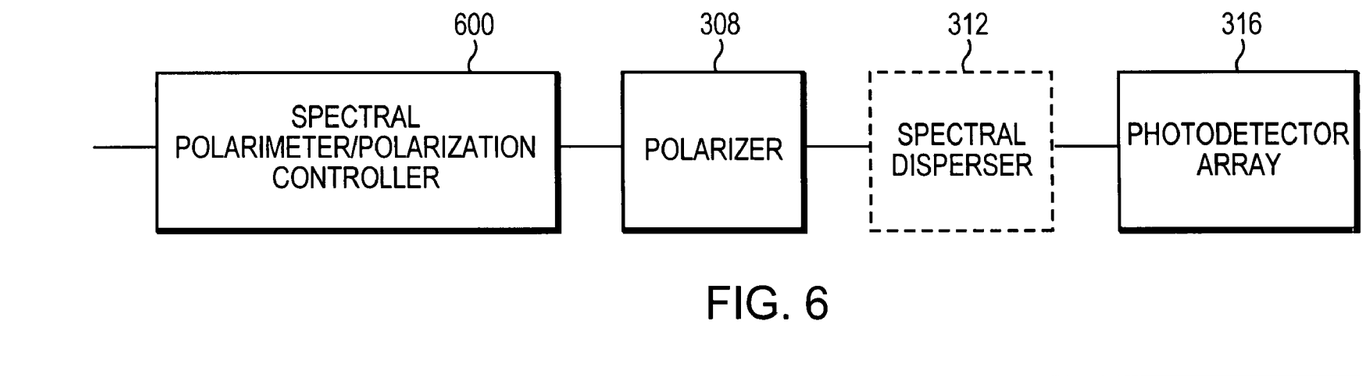
FIG. 6 depicts an embodiment of an OSNR monitor using an in-line polarization controller in accord with the present invention.

As shown in FIG. 6, some embodiments of the spectral polarimeter 300' utilize an in-line polarization controller, and therefore combine the spectral polarimeter and polarization controller functionality in a single combined element 600. This combined element is similarly suited to usage in the embodiment of FIG. 4.

Figure 7:
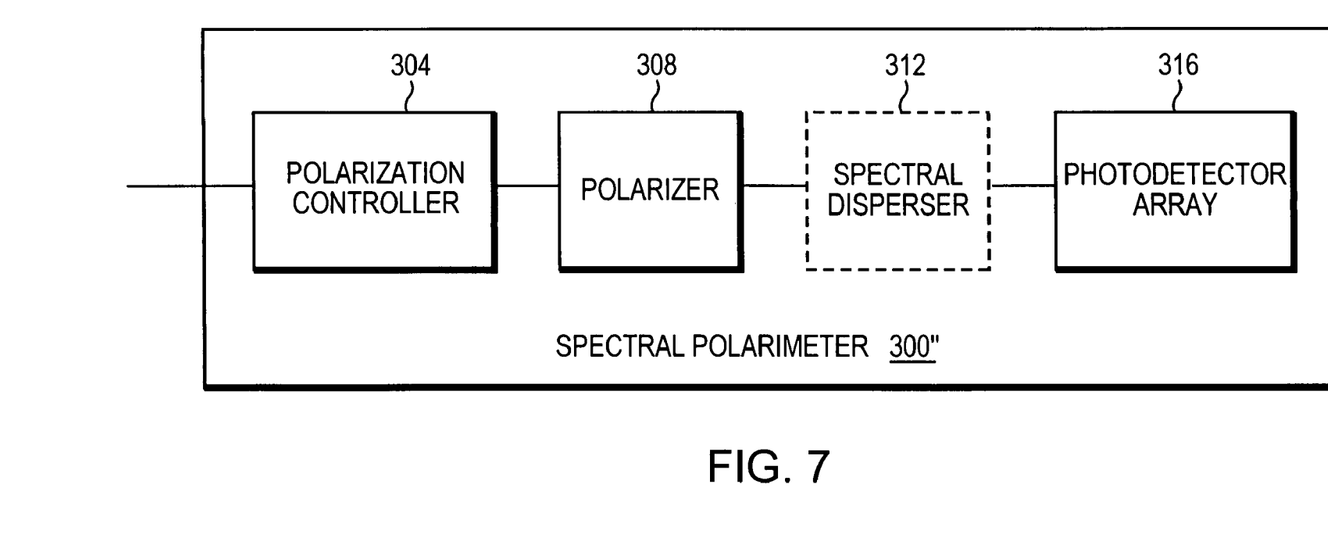
FIG. 7 illustrates a further embodiment of an OSNR monitor in accord with the present invention.
Figure 8:
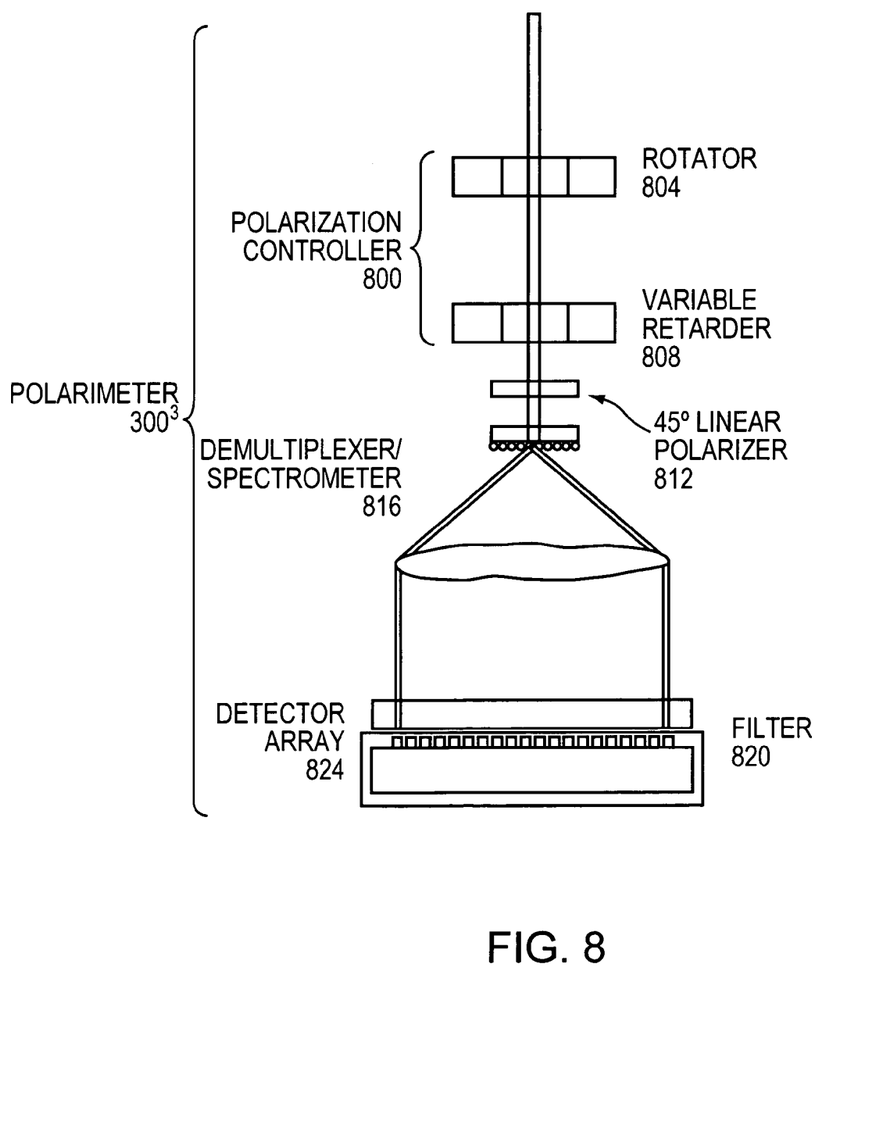
FIG. 8 presents a spectral polarimeter for use with the OSNR monitor of the present invention.

In still another embodiment, the spectral polarimeter 300" itself includes a polarization controller 304, polarizer 308, spectral disperser 312, and detector array 316, as shown in FIG. 7. Other embodiments of the spectral polarimeter 300 are described in aforementioned U.S. patent applications Ser. Nos. 10/101,427 and 10/218,681, one of which is illustrated in FIG. 8.

Figure 9:
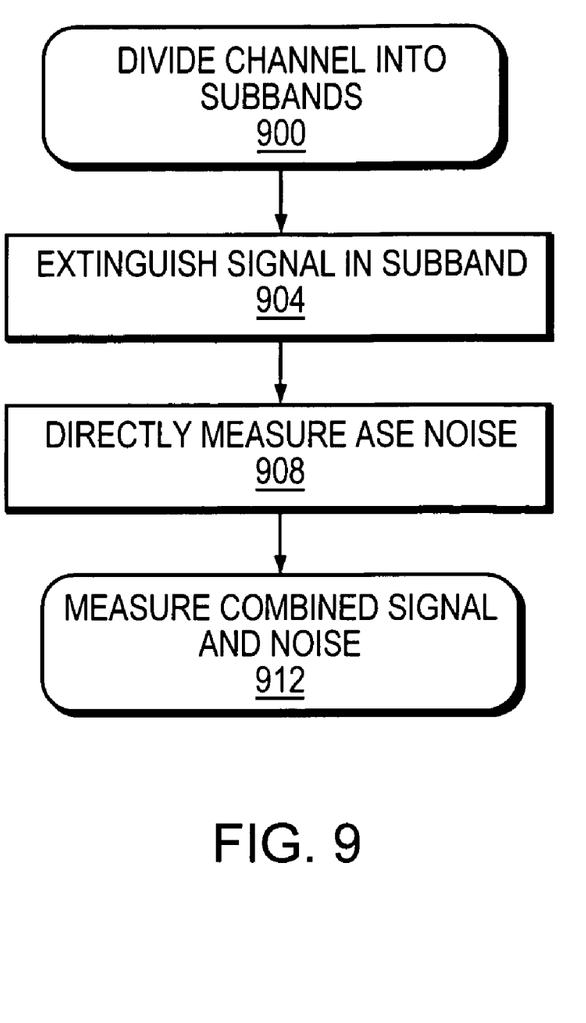
FIG. 9 depicts a method of OSNR measurement in accord with the present invention.
Figure 10:
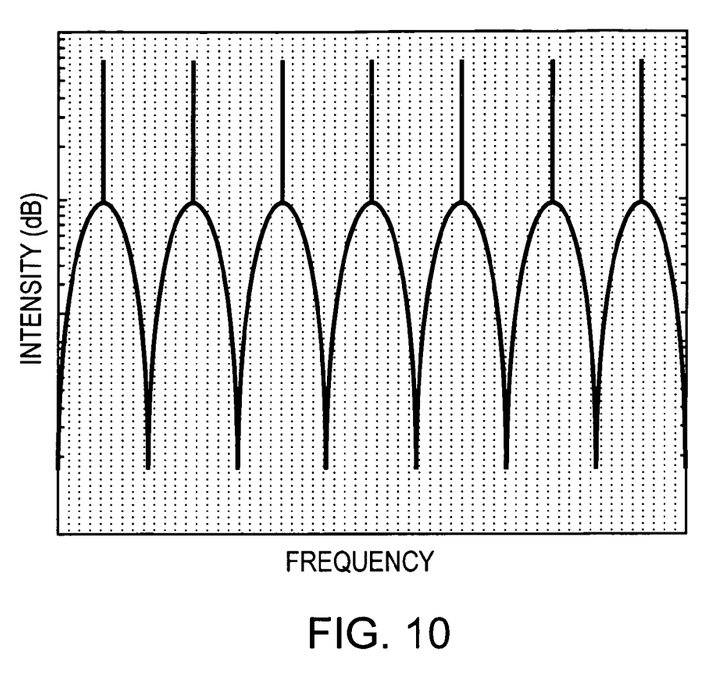
FIG. 10 depicts the frequency spectra of adjacent optical channels in a DWDM optical system divided into wavelength subbands in accord with an embodiment of the invention.

FIG. 9 illustrates a method for performing OSNR measurements in accord with the present invention. First, a wavelength channel is divided into multiple subbands (Step 900). In one embodiment, each wavelength channel is segmented into five to fifteen wavelength subbands, as shown in FIG. 10. The signal component for each subband is extinguished (Step 904), and the residual ASE signals are measured (Step 908). The combination of the signal and noise is also measured (Step 912); this measurement may be performed before or after the signal extinction and measurement of the ASE noise (Steps 904, 908).

Given the minimum and maximum power readings for one optical frequency bin j, and ignoring component imperfections for the sake of clarity, the minimum and maximum power readings are expressed in terms of the signal power and the ASE power as:

$$P_{\min j} = \frac{P_{ASE,j}}{2} \quad \text{(Eq. 4)}$$

$$P_{\max j} = P_{signal,j} + \frac{P_{ASE,j}}{2} \quad \text{(Eq. 5)}$$

The optical signal power of the channel is determined by summing the total power of the signal components across the channel:

$$P_{signal}(\text{channel}) = \sum_{channel} P_{signal_j} \quad \text{(Eq. 6)}$$

and the ASE noise (normalized to a Reference Bandwidth [RBW]) is:

$$P_{ASE}(\text{channel}) = P_{ASE\ jcenter} \frac{RBW}{BW_{jcenter}} \quad \text{(Eq. 7)}$$

where $BW_{jcenter}$ is the full width of one frequency subband j.

It is desirable that the "resolution bandwidth" for an optical channel power measurement exceed 25 GHz for a data rate of 10 Gbits/sec, suggesting that the summation of Eq. 6 should typically be over a bandwidth several times broader than the modulation bandwidth to measure the optical channel power. The optical signal-to-noise ratio in this case is:

$$OSNR = \frac{P_{signal}(\text{channel})}{P_{ASE}(\text{channel})} \quad \text{or, in decibels:} \quad \text{(Eq. 2)}$$

$$OSNR(\text{dB}) = 10 * \log_{10}\left\{\frac{P_{signal}(\text{channel})}{P_{ASE}(\text{channel})}\right\} \quad \text{(Eq. 8)}$$

In an embodiment using a polarization controller to extinguish subband signal components (e.g., the embodiment of FIG. 3), the polarization controller receives the setting parameters that extinguish the signal component (Step 904) and is adjusted to transform the incident signal component to its orthogonal polarization—i.e., the state corresponding to a point on the opposite side of the Poincaré sphere. This orthogonal polarization state results in the signal polarization being maximally transmitted through an adjacent polarizer.

In this embodiment, the computed polarization controller settings for extinguishing the signal component (Step 904) may contain errors due to hardware tolerances and measurement errors. The signal extinction is improved by taking a sequence of ASE measurements with slightly different polarization controller settings. The smallest detected power level in the sequence is then an improved estimate of the ASE noise. In one embodiment, this series of controller settings is a preprogrammed set of polarization controller variations from the nominal extinguishing setting or, alternately, a set of variations determined in real time by a minimization algorithm such as the Levenberg-Marquardt algorithm.

When the polarization controller 304 is set to maximize the detected power, the measured signal of the frequency bin corresponds to the signal power plus nominally one-half of the unpolarized ASE noise power in the frequency bin (Step 912). In embodiments using a polarizer (e.g., the embodiment of FIG. 3), the transmission through a polarizer is often slightly less than one-half for unpolarized light; the absolute transmittance of the polarizer is easily determined, if required.

As discussed above, the fidelity of the OSNR measurements is improved by reducing the spectral bandwidth of the individual measurement channels. For a typical dispersed spectrometer geometry, the measurement resolution is determined by the convolution of the optical point spread function with the signal distribution and the detector size.

Figure 11:
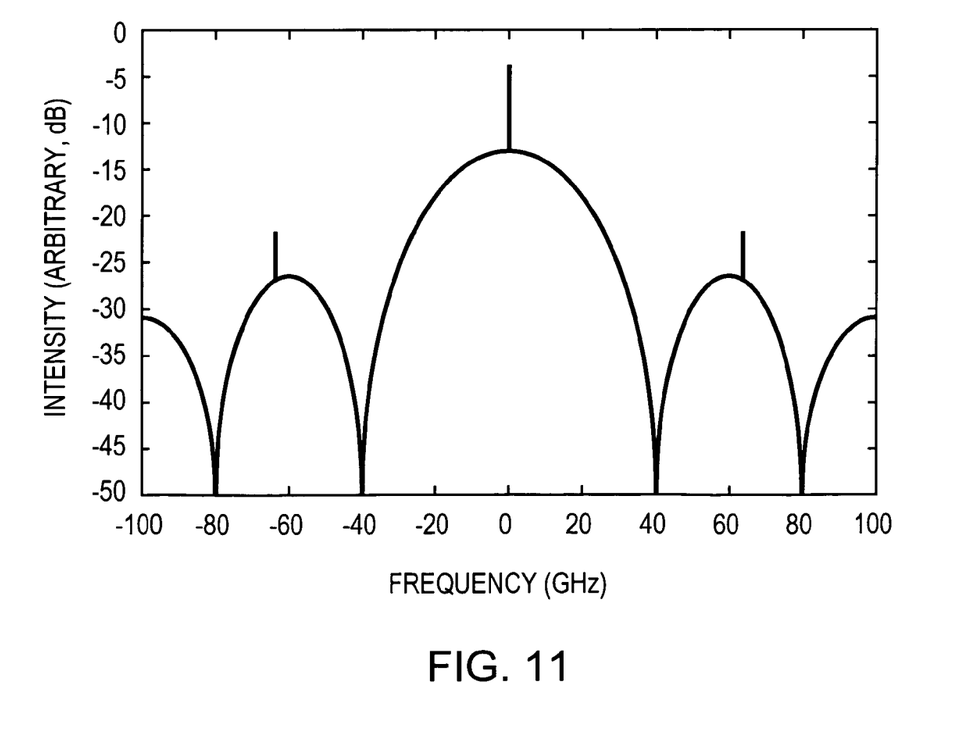
FIG. 11 illustrates the frequency spectra of an optical channel utilizing a typical high-speed communications format such as near return-to-zero (NRZ) or return-to-zero (RZ) format.
Figure 12:
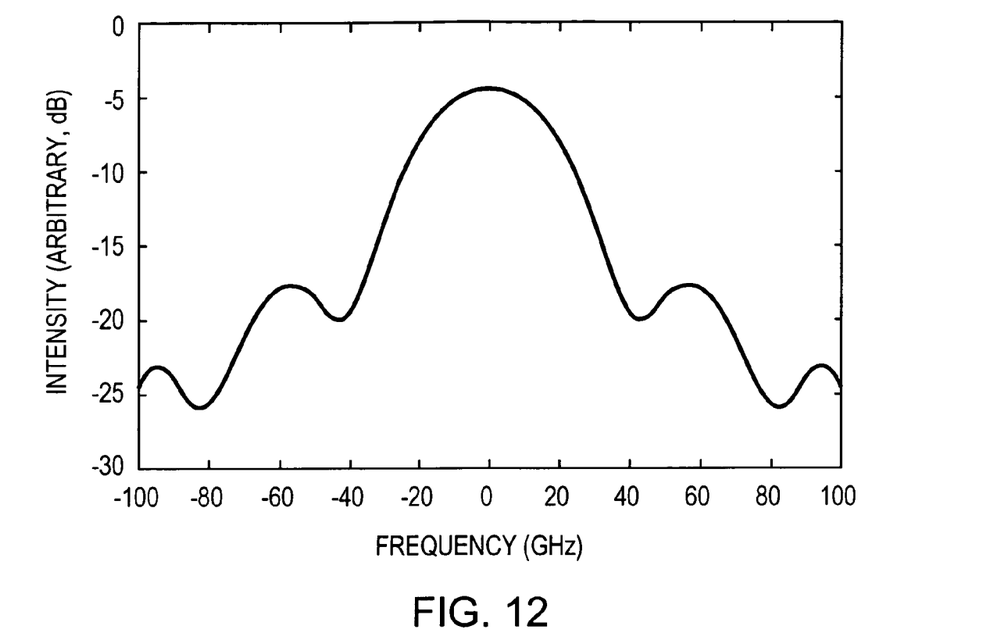
FIG. 12 presents the effect of an optical point spread function on the frequency spectra of the optical channel of FIG. 11.

Typical high-speed fiber optics communications formats, such as near return-to-zero (NRZ) or return-to-zero (RZ) formats, result in narrow high-intensity spectral spikes containing the majority of the channel power, as shown in FIG. 11. The convolution of the optical point spread function or scanning impulse response with the signal distribution spreads the power from these spikes over multiple detector pixels or spectral bins, reducing the Degree of Polarization of the signal integrated over each pixel as each sample now receives both the energy from the appropriate wavelength subband as well as the unintended polarization component from the spike wavelength. FIG. 12 presents the effect of broadening a 40 Gbits/sec RZ spectrum using an optical point spread function with a 25 GHz full-width.

Figure 13:
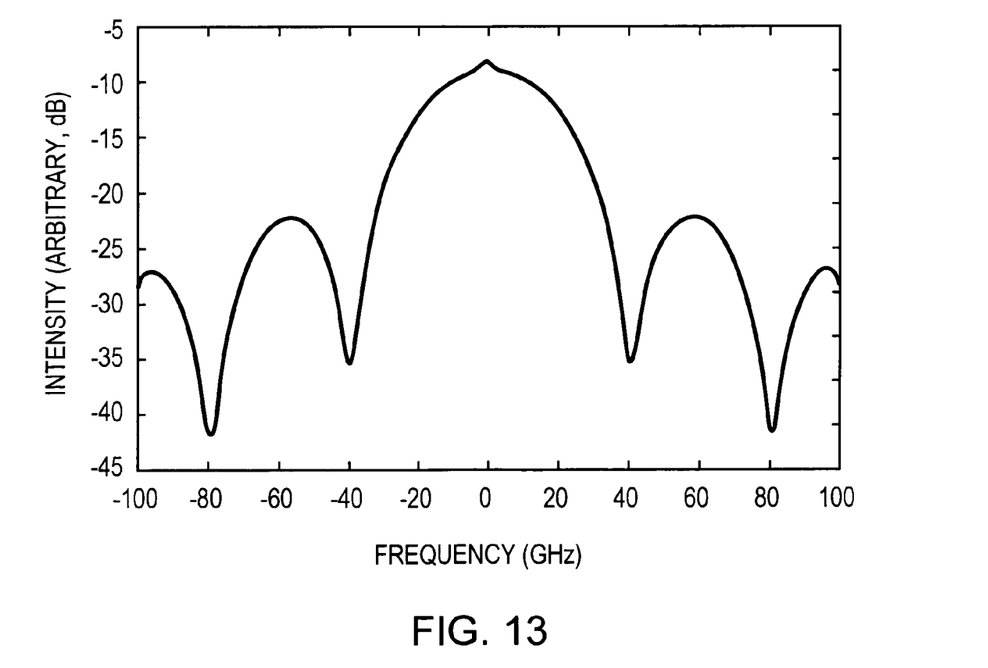
FIG. 13 depicts the effect of a narrow band optical filter on the frequency spectra of FIG. 12.

One embodiment of the invention improves the Degree of Polarization by placing a narrow band optical filter over the detector. If the "full width at half-maximum" (FWHM) of the filter is narrower than the spectral bandwidth subtended by a pixel, the filter effectively reduces the sampling bandwidth such that it approaches the intrinsic limit provided by the detector size. The improvement from the installation of a 10 GHz filter is illustrated in FIG. 13. For the detector to provide this enhancement across the entire spectral band, the center wavelength of the filter should be selected to vary across the detector with approximately the same profile as the spectrometer optical spectrum (to an acceptable tolerance). In various embodiments, the filter is placed in close proximity to the detector, or is located at an optical conjugate plane which images the filter onto the detector array. One suitable optical filter is a Fabry-Perot interference filter with a varying center wavelength caused by a spatial variation in the optical thickness of the spacer. Alternately, the same filtering may be provided in the embodiment of FIG. 4 by narrowing the filter spectral width. In both instances, additional improvement is possible in software using deconvolution or impulse response subtraction techniques to sharpen the frequency spectrum, assuming the spectral impulse response of the instrument is well characterized.

Figure 14:
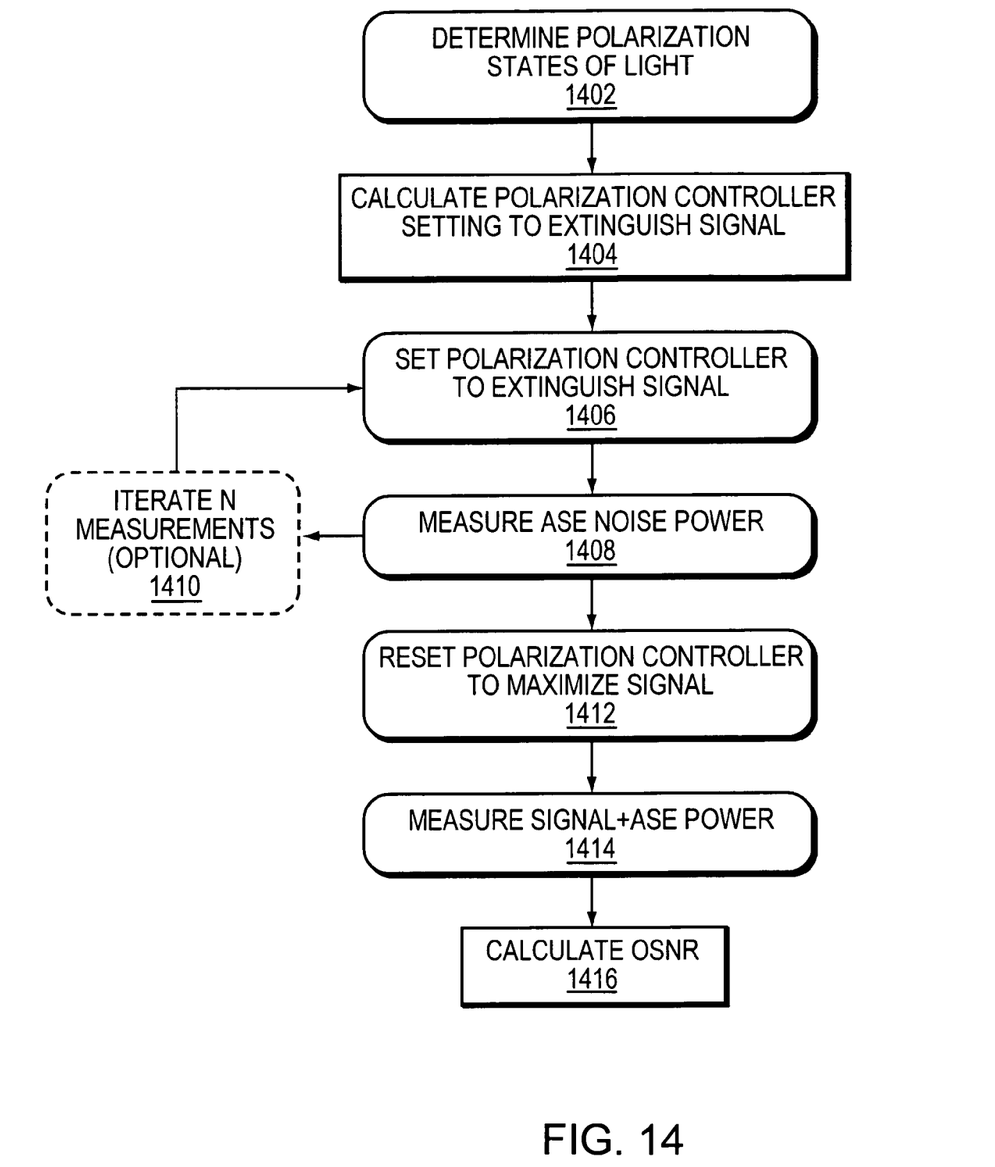
FIG. 14 depicts a method of OSNR measurement in accord with the present invention.

One embodiment of a method for a single frequency bin measurement, or for a broadband measurement extinguishing the signal simultaneously across the entire spectral band of interest, is illustrated in FIG. 14. The incident polarization state 207 for each frequency subband is determined using, e.g., a spectral polarimeter (Step 1402). The polarization controller settings required to extinguish the signal component for each frequency subband are calculated in accord with the method illustrated in FIG. 2 (Step 1404). The polarization controller is set to the polarization transformation 205 which extinguishes the signal component of the given frequency subband (Step 1406). This method may also be used if the ASE component in one frequency subband is considered representative over the modulation bandwidth of a data channel.

With the signal component in the subband extinguished, the detector (or detector array) measures nominally one-half the ASE noise power (Step 1408). As discussed above, the signal extinction is optionally improved by taking multiple measurements with varied polarization controller settings, resulting in an improved estimate of the ASE noise (Step 1410).

Resetting the polarization controller to maximize the signal through the polarizer for the current frequency subband (Step 1412) results in the transmission through the polarizer of the signal component plus nominally one-half of the ASE background noise in the current frequency subband. The power of the combined signal and ASE noise is measured by, e.g., a detector or a detector array (Step 1414). Using these measurements, it is possible to determine the OSNR value as described above. The channel OSNR value in the case of multiple frequency subbands is calculated using Eqs. 4–8 after completing measurements of the minimum and maximum powers in the subbands. In one embodiment, the power in the combination of the signal and the noise component is measured (Steps 1412, 1414) before the signal component is extinguished and the power in the noise component alone is determined (Step 1406–1410).

Figure 15:
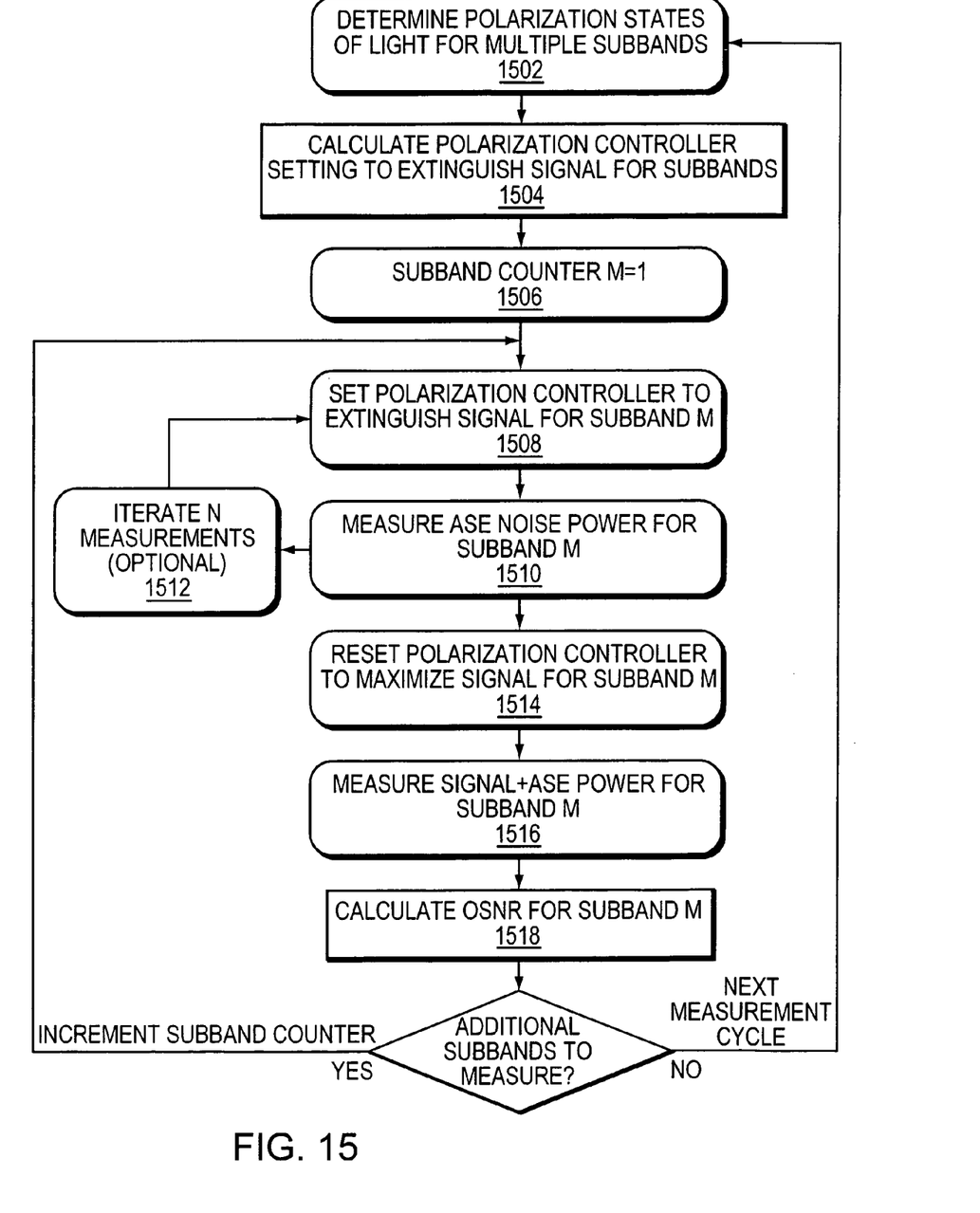
FIG. 15 illustrates a method of OSNR measurement for use when the signal spectrum is segmented into multiple frequency subbands in accord with the present invention.

FIG. 15 illustrates an embodiment of a method of the present invention for use when the signal spectrum is segmented into multiple frequency subbands for each OSNR calculation. The measurement of incident polarization states in the subbands (Step 1502) is performed in parallel with an appropriate spectral polarimeter or is performed in seriatim with a temporally scanning filter. The calculation of the polarization controller settings for extinguishing the signal component of each frequency subband may be completed at once for all of the subbands or, alternately, sequentially as each frequency subband is to be extinguished (Step 1504). With the measurements and calculations completed, each frequency subband is sequentially extinguished and the OSNR for the subband is determined using, for example, the method depicted in FIG. 14, which is incorporated into FIG. 15 at Steps 1506–1518. Once the measurements have been completed for the desired frequency subbands, the OSNR for the channel is calculated using Eqs. 4–8.

In another embodiment, the use of a multichannel polarization controller with appropriate optics allows the simultaneous extinguishing of the signals in multiple frequency subbands, eliminating the iterative loop of extinction, measurement, and calculation for each subband presented in FIG. 1. One suitable multichannel polarization controller for use in this manner is a liquid crystal array of polarization controllers constructed from multiple liquid crystal displays. Other embodiments of multichannel polarization controllers, including the liquid crystal embodiment, are described in aforementioned U.S. patent application Ser. No. 10/101, 427.

Additionally, one set of polarization state measurements (e.g., Stokes parameters) may be used to simultaneously measure the signal power in all of the subbands of all of the channels. Then, a measurement of the ASE at a single subband in each channel is typically sufficient to measure the OSNR of all of the channels. This minimizes the cycle time for a complete multichannel OSNR measurement.

The OSNR monitor of the current invention also provides a range of optical monitor capabilities as a byproduct of the previously-described measurement methodology. The spectrally-resolved power measurements described herein also provide optical channel power, channel wavelength monitoring, and optical spectrum analyzer (OSA) functionality.

Many alterations and modifications may be made by those having ordinary skill in the art without departing from the spirit and scope of the invention. Therefore, it must be expressly understood that the illustrated embodiments have been shown only for purposes of example and should not be taken as limiting the invention. The invention should therefore be understood to include, for example, all equivalent elements that are insubstantially different, even though not identical in other respects to what is shown and described in the above illustrations. Possible variations include, but are not limited to, additional folds and glass plates, the use of roof and corner cubes for reflections, and variations in optical and spacer materials.

What is claimed is:

1. A method for performing optical measurements within an optical channel comprising:
   (a) measuring the polarization state of a signal over a frequency subband in the channel;
   (b) extinguishing the signal in the frequency subband using the measured polarization state; and
   (c) determining the power of a noise component in the frequency subband.

2. The method of claim 1 further comprising: (d) determining the combined power of the signal and the noise component in the frequency subband.

3. The method of claim 1 further comprising sequentially iterating steps (a) through (c) over multiple frequency subbands in the optical channel.

4. The method of claim 1 further comprising iterating steps (a) through (c) over multiple frequency subbands in the optical channel in parallel.

5. The method of claim 1 wherein extinguishing the signal comprises transforming the polarization state of the signal to a first polarization state that is nominally orthogonal to the polarization state of the transmission axis of an optical polarizer.

6. The method of claim 5 wherein determining the noise power comprises:
   measuring the power of the noise component after the transformation to the first polarization state;
   transforming the polarization state of the signal to a second polarization state that is nominally different from the first polarization state;
   determining the power of the noise component after the transformation to the second polarization state; and
   retaining the lower of the two noise power measurements.

7. The method of claim 6 wherein the difference between the first polarization state and the second polarization state is predetermined.

8. The method of claim 6 wherein the difference between the first polarization state and the second polarization state is determined in real-time.

9. The method of claim 2 wherein determining the combined power comprises transforming the polarization state of the signal to a polarization state that is nominally aligned with the polarization state of the transmission axis of an optical polarizer.

* * * * *